July 27, 1965

T. R. GARMAN 3,197,249

ADJUSTABLE MATERIAL HANDLING GRAB

Filed Nov. 13, 1962

INVENTOR.
TED R. GARMAN
BY Williams, David,
Hoffmann & Yount
ATTORNEYS

July 27, 1965 T. R. GARMAN 3,197,249
ADJUSTABLE MATERIAL HANDLING GRAB
Filed Nov. 13, 1962 2 Sheets-Sheet 2
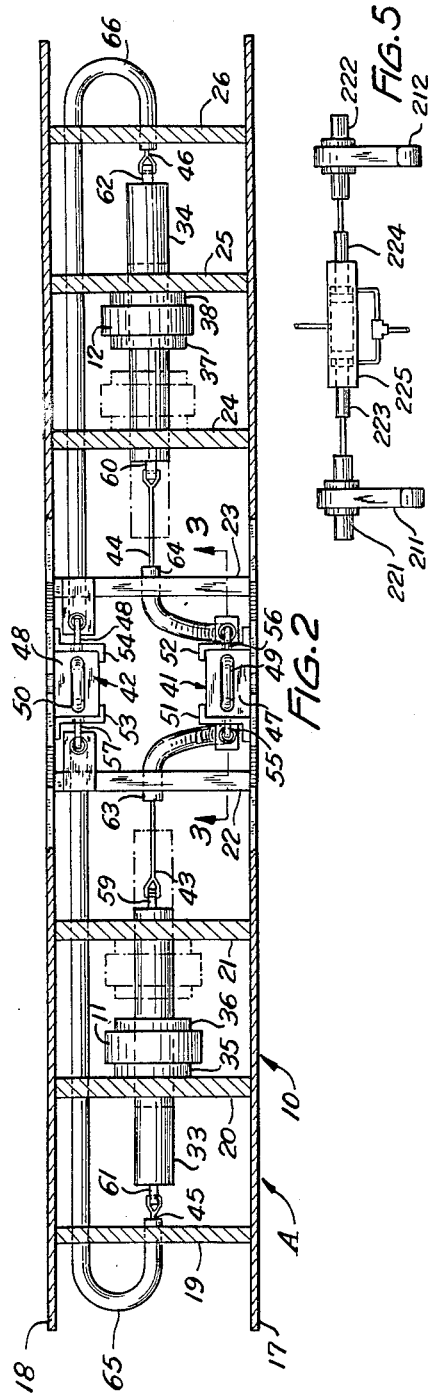
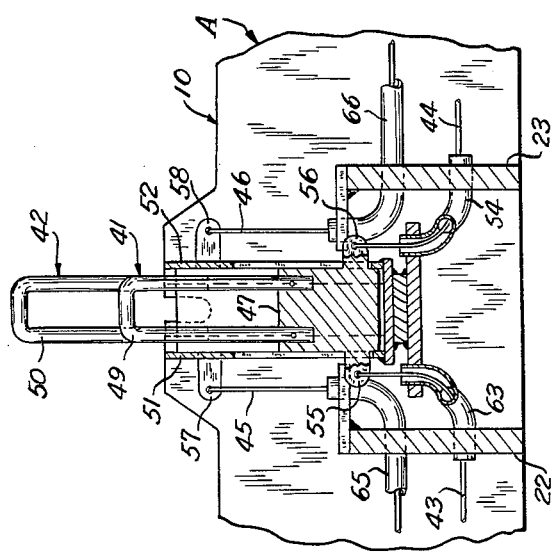
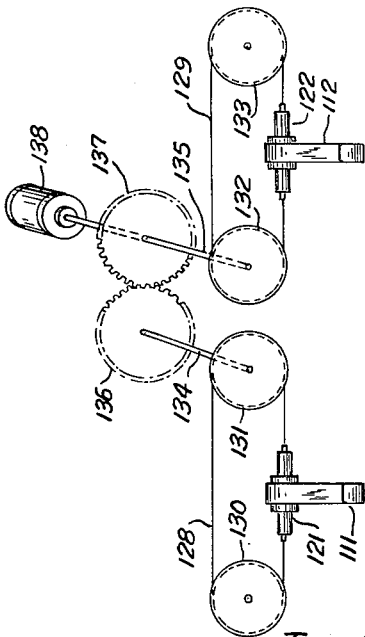
INVENTOR.
TED R. GARMAN
BY Williams, David,
Hoffmann & Yount.
ATTORNEYS United States Patent Office 3,197,249
Patented July 27, 1965

3,197,249
ADJUSTABLE MATERIAL HANDLING GRAB
Ted R. Garman, Pittsburgh, Pa., assignor to The Cleveland Crane & Engineering Company, Wickliffe, Ohio, a corporation of Ohio
Filed Nov. 13, 1962, Ser. No. 237,159
2 Claims. (Cl. 294—81)

The present invention relates to material handling apparatus and more particularly to an adjustable material handling grab for lifting loads of various sizes.

One of the principal objects of the invention is the provision of a novel and an improved material handling grab adapted to be suspended from an overhead structure and including a pair of rigid load-engaging members spaced from each other and movable toward and from one another for handling different size loads.

Another object of the invention is the provision of a new and improved material handling grab of the character referred to in which the spaced load-engaging members are connected to the frame assembly for movement toward and from one another and for pivotal movement about a common axis.

The invention resides in certain constructions and combinations and arrangements of parts, and further objects and advantages will be apparent to those skilled in the art to which the invention relates from the following description of the preferred embodiment described with reference to the accompanying drawings forming a part of this specification and in which;

FIG. 2 is a sectional view taken approximately on line 2—2 of FIG. 1;

FIG. 3 is an enlarged sectional view taken approximately on line 3—3 of FIG. 2;

FIG. 4 is a schematic view of an electrically actuated reversible motor arrangement for adjusting the grab; and FIG. 5 is a schematic view of a double-acting type fluid motor arrangement for adjusting the grab.

Figure 1:
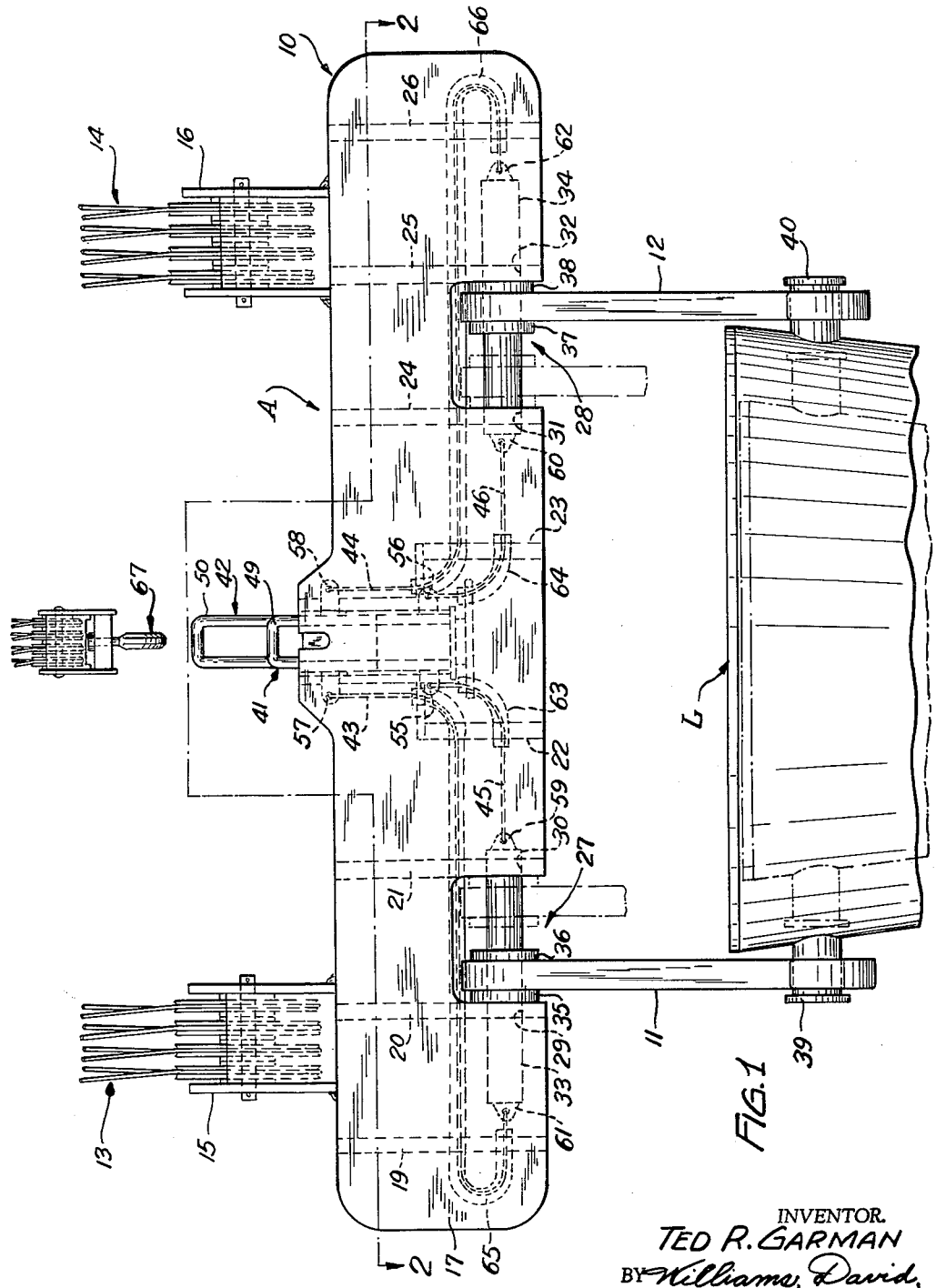
FIG. 1 is an elevational view of an overhead-supported material handling grab embodying the present invention and illustrating in solid line and in phantom lines part of an exemplary load of the largest and smallest dimensional size load, respectively, engageable by the grab.

While the present invention is susceptible of being embodied in various constructions, the preferred embodiment, shown in the drawings and herein described in detail, is especially designed for handling ladles, such as slag ladles employed in steel mills, and to be used with an overhead crane similar to that disclosed in Harry et al. U.S. Patent No. 1,430,009. It is to be understood, however, that there is no intention to limit the invention to the specific apparatus shown, but it is the intention to cover hereby any and all embodiments of the invention herein disclosed.

The material handling grab, shown and designated generally as A, comprises an elongated frame assembly 10 having at its underside spaced, load-engaging members or hook members 11, 12 spaced lengthwise of the frame assembly, pivotally connected thereto about a common axis and movable toward and from one another. The grab A is shown suspended from the trolley of the overhead crane shown in the Harry et al. patent by the main hoist cables indicated generally at 13, 14, which cables are reeved through sets of sheaves 15, 16 respectively, fixed to the frame assembly.

The frame assembly 10 includes a pair of side walls 17, 18 spaced from each other by internal reinforcing members 19, 20, 21, 22, 23, 24, 25 and 26, which are fixed to the side walls at right angles. The manner of construction of the frame assembly is relatively unimportant to the scope of the invention as long as the construction is suitable for supporting the desired loads to be handled, and is capable of supporting the particular components of the grab which are to be desired.

The frame assembly 10 is provided with a pair of spaced open portions 27, 28 formed by cut-outs through part of the side walls 17, 18 between the internal reinforcing members 20, 21 and 24, 25, respectively. These reinforcing members, which are contiguous to the open portions 27, 28, are provided with openings 29, 30 and 31, 32, respectively, aligned lengthwise of the frame assembly 10. Each pair of openings 29, 30, and 31, 32, supports aligned shaft means 33, 34 for sliding movement along a common axis.

The load-engaging members or hook members 11, 12 are pivotally connected to the shaft means 33, 34, respectively, so that each load-engaging member, which is of rigid construction, is at right angles to the common axis of the shaft means and projects from the underside of the frame assembly 10. The load-engaging members 11, 12 are located on the respective shaft means 33, 34 and are held against axial movement relative thereto by pairs of collars 35, 36 and 37, 38, respectively. Each collar closely abuts one side of a load-engaging member. The collars also serve to limit the extent that each shaft means and its connected hook member is axially movable toward and from the other shaft means and connected hook member along the common axis relative to the frame assembly 10 by their abutment with the reinforcing members 20, 24 or 21, 25 adjacent thereto.

In FIG. 1 the lower ends of the hook members 11, 12 are illustrated as engaging about projections or gudgeons 39, 40, on the opposite sides, respectively, and adjacent the top of a slag ladle L. This slag ladle illustrates the largest size capable of being handled by the grab. The phantom lines shown in FIG. 1 as well as those in FIG. 2 represent the smallest slag ladle that grab A can handle and the positions in which the hook members, shaft means and collars would be disposed accordingly. It should be understood, however, that the illustration of a ladle is by way of example only, and that the invention is not limited to ladle-engaging grabs only, but includes also other types of load-engaging grabs.

The means shown in the preferred embodiment of the invention for adjusting or causing the shaft means 33, 34 and their connected load-engaging members 11, 12 to be moved toward and from one another relative to the frame assembly 10 in order to condition the grab for the handling of different size loads or objects includes a pair of pull assemblies 41, 42, the former of which is operably connected to the ends of the shaft means 33, 34 nearest to one another by cables or chains 43, 44, and the latter of which is connected to the ends of the shaft means farthest from one another by cables or chains 45, 46. The pull assemblies 41, 42 include rectangular members or blocks 47, 48 having inverted U-shaped members 49, 50, respectively, attached to and projecting from their top sides. The blocks 47, 48 are slidably supported for upward and downward movement relative to the frame assembly in channels formed on the frame assembly by bracket members 51, 52 and 53, 54, respectively, secured to the inside surfaces of the side walls 17, 18 of the frame assembly. The pull assemblies 41, 42 further include anchor lugs 55, 56 and 57, 58, respectively, projecting from the opposite sides of the blocks 47, 48 through elongated slots provided in the bracket members 51, 52, 53, 54. Anchor lugs 59, 60 are provided respectively on the ends of the shaft means 33, 34 closest to the center of the frame assembly 10, and anchor lugs 61, 62 are provided respectively on the ends of the shaft means 33, 34 farthest from the frame assembly center.

The cables or chains 43, 44 extend respectively through tubular guide members 63, 64 and are connected to the lugs 55, 56, respectively, of the pull assembly 41 and to the lugs 59, 60, respectively, on the adjacent ends of the shaft means 33, 34, respectively. The cables or chains 45, 56 extend respectively through tubular guide members 65, 66 and are connected to the lugs 57, 58, respectively, of the pull assembly 42 and to the lugs 61, 62, respectively, on the ends of the shaft means 33, 34, respectively, farthest from one another. The tubular or pipe-like guide members 63, 64, 65, 66 are supported within the frame assembly 10 by the internal reinforcing members and serve to channel the transmitting forces between the pull assemblies and the shaft means in a very simple manner.

When the operator desires to adjust the spacing between the load-engaging or hook members 11, 12, he pulls up on one or the other of the inverted U-shaped members 49, 50 of the corresponding pull assembly, and moves the desired member until the load-engaging members are spaced apart from each other the desired distance. This pulling operation is accomplished when there is no load on the material handling grab, and in the embodiment shown by the auxiliary hook 67 of the crane mechanism shown in the aforementioned Harry et al. patent. The auxiliary hook 67 may be used to engage either pull assembly 41 or 42. The upward pulling movement of pull assembly 41, for example, is transmitted to the ends of the shaft means 33, 34 nearest to one another by the operably connected chains or cables 43, 44. The other pull assembly 42, if in its raised position, concurrently is pulled downwardly by the chains or cables 45, 46 operably connected to the outer ends of the shaft means 33, 34, respectively. The bracket members 51, 52 and 53, 54, respectively, fit closely to the rectangular members or blocks 47, 48 so that when one block is in the upward position it will be frictionally retained in that position when the auxiliary hook 67 is removed.

It should now be apparent that the character of the structure for adjusting the spacing between the load-engaging or hook members is relatively simple and involves only a few moving parts readily constructed without difficulty.

While in the preferred embodiment the load-engaging members are moved toward and from one another by an arrangement of pull assemblies, chains or cables, and guide pipes, it should be understood that there are other arrangements possible for causing this movement. Two such arrangements are disclosed schematically in FIGS. 4 and 5 by way of example. As shown in FIG. 4, load engaging hook members 111, 112 are pivotally connected to shaft means 121, 122 and located in position thereon by pairs of collars, as in the embodiment of FIGS. 1, 2 and 3. The ends of the shaft means 121, 122 are operably connected to opposite ends of sprocket chains 128, 129, respectively, which are trained about pairs of sprockets 130, 131 and 132, 133, respectively. The inner sprockets 131, 132 are fixedly connected to shafts 134, 135 provided with gears 136, 137, respectively, in mesh with one another. The extension of shaft 135 beyond gear 137 is drivingly connected to a suitable electrically actuated reversible prime mover such as electric motor 138.

In FIG. 5 a double-acting reciprocating fluid type motor 210 is employed for adjusting the spacing between the rigid load-engaging or hook members 211, 212. Collars similarly locate the hook members on the respective shaft means 221, 222 as in FIGS. 1, 2, 3 and 4. The inner ends of the shaft means are operably connected to pistons 223, 224 within the cylinder 225 of the motor 210 which may be hydraulically or pneumatically operated.

From the foregoing discussion of the preferred embodiment of the invention and its various exemplary modifications, it will be apparent that the objects heretofore enumerated and others have been accomplished and that there has been provided a novel and improved adjustable material handling grab designed for handling load sizes of various dimensions. As previously mentioned, the invention is not limited to the particular constructions shown, but it is the intention to hereby cover any construction utilizing load-engaging members movable toward and away from each other for the purpose indicated.

Having described my invention, I claim:

1. In an adjustable material handling grab: an elongated frame assembly; first and second means adjacent to opposite ends of said frame assembly for supporting the same from an overhead hoist structure having auxiliary hoist mechanism; first and second spaced rigid load engaging members; third and fourth means connecting said first and second load engaging members, respectively, to said frame assembly for movement relative thereto lengthwise thereof toward and from one another; and fifth and sixth means slidably supported in said frame assembly for movement normally to the direction of movement of said load engaging members in said frame assembly adapted to be selectively engaged and moved by an auxiliary hoist mechanism and connected to one another and to said third and fourth means for moving said load engaging members toward and from one another.

2. In an adjustable material handling grab: an elongated frame assembly adapted to be suspended from a main hoist structure having auxiliary hoist mechanism; a pair of spaced rigid load-engaging members; first means connecting the load-engaging members to said frame assembly for movement relative thereto toward and from one another; and second means on said frame assembly connected to said first means and mounted for movement in a direction normal to the direction of movement of said load-engaging members, said second means adapted to be engaged and moved by an auxiliary hoist mechanism for actuating said first means to move said load-engaging members toward and from one another.

References Cited by the Examiner

UNITED STATES PATENTS

| | | | |
|---|---|---|---|
| 1,426,764 | 8/22 | Parker | 294—81 |
| 3,030,138 | 4/62 | Bennett | 294—88 |
| 3,076,673 | 2/63 | Kaplan | 294—81 |

FOREIGN PATENTS 416,695    1925    Germany.

SAMUEL F. COLEMAN, *Primary Examiner.*

ERNEST A. FALLER, Jr., *Examiner.*